(12) United States Patent
Liu et al.

(10) Patent No.: US 9,233,344 B1
(45) Date of Patent: Jan. 12, 2016

(54) HIGH SELECTIVITY POLYIMIDE MEMBRANE FOR NATURAL GAS UPGRADING AND HYDROGEN PURIFICATION

(71) Applicant: UOP LLC, Des Plaines, IL (US)

(72) Inventors: Chunqing Liu, Arlington Heights, IL (US); Howie Q. Tran, Skokie, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/499,332

(22) Filed: Sep. 29, 2014

(51) Int. Cl.
   *B01D 71/64* (2006.01)
   *B01D 53/22* (2006.01)
   *B01D 69/12* (2006.01)
   *B01D 63/00* (2006.01)
   *B01D 69/08* (2006.01)

(52) U.S. Cl.
   CPC ............... *B01D 71/64* (2013.01); *B01D 63/00* (2013.01); *B01D 69/08* (2013.01); *B01D 69/125* (2013.01)

(58) Field of Classification Search
   CPC ...... B01D 53/228; B01D 63/00; B01D 69/08; B01D 69/125; B01D 71/64
   USPC ......................................... 96/4, 14; 95/45, 51
   See application file for complete search history.

(56) References Cited

U.S. PATENT DOCUMENTS

| 4,950,314 | A | * | 8/1990 | Yamada | B01D 67/0002 86/14 |
|---|---|---|---|---|---|
| 5,053,314 | A | * | 10/1991 | Yamaoka | G03F 7/039 430/176 |
| 5,112,941 | A | * | 5/1992 | Kasai | B01D 67/0093 96/14 |
| 5,591,250 | A | * | 1/1997 | Stern | B01D 53/228 95/51 |
| 6,790,263 | B1 | * | 9/2004 | Ding | B01D 53/228 96/14 |
| 7,247,191 | B2 | | 7/2007 | Koros et al. | |
| 7,485,173 | B1 | | 2/2009 | Liu et al. | |
| 8,016,124 | B2 | | 9/2011 | Yates et al. | |
| 8,337,598 | B2 | | 12/2012 | Yates et al. | |
| 2004/0107830 | A1 | * | 6/2004 | Simmons | B01D 53/228 95/45 |
| 2010/0243567 | A1 | * | 9/2010 | Liu | B01D 67/0088 95/51 |
| 2014/0130668 | A1 | * | 5/2014 | Sano | B01D 71/64 95/51 |
| 2015/0093510 | A1 | * | 4/2015 | Liu | B01D 67/0006 96/14 |

OTHER PUBLICATIONS

Park, "Polymers with Cavities Tuned for Fast Selective Transport of Small Molecules and Ions", Science, Oct. 12, 2007, vol. 318, pp. 254-258.
U.S. Appl. No. 14/499,331, filed Sep. 29, 2014.

* cited by examiner

*Primary Examiner* — Jason M Greene

(57) ABSTRACT

A polyimide polymer having hydroxyl and acetoxy function groups is provided together with a membrane made from the polymer. Also provided is a process for separating at least one gas from a mixture of gases using a polyimide membrane comprising a polyimide polymer with hydroxyl and acetoxy functional the process comprising: (a) providing the polyimide membrane comprising the polyimide polymer with hydroxyl and acetoxy functional groups which is permeable to the at least one gas; (b) contacting the mixture on one side of the polyimide membrane to cause said at least one gas to permeate the membrane; and (c) removing from the opposite side of the membrane a permeate gas composition comprising a portion of said at least one gas which permeated the polyimide membrane.

11 Claims, No Drawings

HIGH SELECTIVITY POLYIMIDE MEMBRANE FOR NATURAL GAS UPGRADING AND HYDROGEN PURIFICATION

BACKGROUND OF THE INVENTION

This invention relates to a high selectivity polyimide membrane comprising a polyimide polymer with hydroxyl and acetoxy functional groups and methods for making and using the membrane.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including $N_2$ enrichment from air, carbon dioxide removal from natural gas and from enhanced oil recovery, and also in hydrogen removal from nitrogen, methane, and argon in ammonia purge gas streams. For example, UOP's Separex™ cellulose acetate spiral wound polymeric membrane is currently an international market leader for carbon dioxide removal from natural gas.

Polymers provide a range of properties including low cost, permeability, mechanical stability, and ease of processability that are important for gas separation. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability.

The membranes most commonly used in commercial gas and liquid separation applications are asymmetric polymeric membranes and have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

One of the components to be separated by a membrane must have a sufficiently high permeance at the preferred conditions or an extraordinarily large membrane surface area is required to allow separation of large amounts of gases or liquids. Permeance, measured in Gas Permeation Units (GPU, 1 GPU=$10^{-6}$ $cm^3$ (STP)/$cm^2$ s (cm Hg)), is the pressure normalized flux and is equal to permeability divided by the skin layer thickness of the membrane. Commercially available gas separation polymer membranes, such as CA, polyimide, and polysulfone membranes formed by phase inversion and solvent exchange methods have an asymmetric integrally skinned membrane structure. Such membranes are characterized by a thin, dense, selectively semipermeable surface "skin" and a less dense void-containing (or porous), nonselective support region, with pore sizes ranging from large in the support region to very small proximate to the "skin". However, fabrication of defect-free high selectivity asymmetric integrally skinned polyimide membranes is difficult. The presence of nanopores or defects in the skin layer reduces the membrane selectivity. The high shrinkage of the polyimide membrane on cloth substrate during membrane casting and drying process results in unsuccessful fabrication of asymmetric integrally skinned polyimide flat sheet membranes using phase inversion technique.

US 2005/0268783 A1 disclosed chemically cross-linked polyimide hollow fiber membranes prepared from a monoesterified polymer followed by final cross-linking after hollow fiber formation.

U.S. Pat. No. 7,485,173 disclosed UV cross-linked mixed matrix membranes via UV radiation. The cross-linked mixed matrix membranes comprise microporous materials dispersed in the continuous UV cross-linked polymer matrix.

U.S. Pat. No. 8,016,124 disclosed a thin film composite membrane (TFC) comprising a blend of polyethersulfone and aromatic polyimide polymers. The TFC membrane has a layer of a blend of polyethersulfone and aromatic polyimide with a thickness from about 0.1 to about 3 microns.

U.S. Pat. No. 8,337,598 disclosed a TFC hollow fiber membrane with a core player and a sheath UV-crosslinked polymer layer.

A publication in SCIENCE reported a new type of high permeability thermally rearranged polybenzoxazole polymer membranes for gas separations (Ho Bum Park et al, SCIENCE 318, 254 (2007)). The thermally rearranged polybenzoxazole membranes are prepared from high temperature heat treatment of hydroxyl-containing polyimide polymer membranes containing pendent hydroxyl groups ortho to the heterocyclic imide nitrogen. These polybenzoxazole polymer membranes exhibited extremely high $CO_2$ permeability (>1000 Barrer) which is similar to that of some inorganic molecular sieve membranes but lower $CO_2/CH_4$ selectivity than that of some small pore inorganic molecular sieve membranes for $CO_2/CH_4$ separation.

Integrally-skinned asymmetric membranes have a selective thin layer and a porous layer from the same membrane material and formed from the same membrane solution at about the same time. Therefore, the selective thin layer of an integrally-skinned asymmetric membrane cannot be delaminated easily from the non-selective porous layer.

The present invention discloses a high selectivity polyimide membrane comprising a polyimide polymer with hydroxyl and acetoxy functional groups, methods for making the membrane, and the use of the membrane for natural gas upgrading and H₂ purification.

SUMMARY OF THE INVENTION

This invention pertains to a high selectivity polyimide membrane comprising a polyimide polymer with hydroxyl and acetoxy functional groups, methods for making the membrane, and the use of the membrane for natural gas upgrading and H₂ purification. This invention pertains to a thin film composite membrane or an asymmetric integrally skinned membrane comprising a polyimide polymer with hydroxyl and acetoxy functional groups and with either flat sheet or hollow fiber geometry.

The present invention provides a high selectivity polyimide membrane comprising a polyimide polymer with hydroxyl and acetoxy functional groups. The incorporation of both hydroxyl and acetoxy functional groups into the polyimide polymer in the present invention provides the membrane comprising the polyimide polymer with hydroxyl and acetoxy functional groups not only high selectivity, but also high plasticization resistance due to the existence of H-bondings. The molar ratio of the hydroxyl groups to the acetoxy groups on the polyimide in the present invention needs to be in a range of 1:1 to 8:1 in order to make the polyimide membrane with high selectivity, high permeance, as well as high plasticization resistance to $CO_2$ and other condensable gases.

The present invention provides a high selectivity polyimide membrane comprising a polyimide polymer with hydroxyl and acetoxy functional groups that comprises a plurality of repeating units of formula (I), wherein formula (I) is tion comprises good solvents for the polyimide polymer that can completely dissolve the polymer. Representative good solvents for use in this invention include N-methylpyrrolidone (NMP), N,N-dimethyl acetamide (DMAC), methylene chloride, N,N-dimethylformamide (DMF), dimethyl sulfoxide (DMSO), dioxanes, 1,3-dioxolane, acetone, mixtures thereof, others known to those skilled in the art and mixtures thereof. In some cases, the membrane dope formulation for the preparation of asymmetric integrally-skinned flat sheet or hollow fiber high selectivity polyimide membrane comprising a polyimide polymer with hydroxyl and acetoxy functional groups in the present invention also comprises poor solvents that cannot dissolve the polymers such as methanol, ethanol, tetrahydrofuran (THF), toluene, n-octane, n-decane, lactic acid, citric acid, isopropanol, and mixtures thereof. It is believed that the proper weight ratio of the solvents used in the present invention provides asymmetric integrally-skinned flat sheet or hollow fiber polyimide membrane comprising a polyimide polymer with hydroxyl and acetoxy functional groups with less than 200 nm super thin nonporous selective skin layer which results in high permeances.

The thin film composite polyimide membrane comprising a polyimide polymer with hydroxyl and acetoxy functional groups described in the current invention comprises a thin nonporous selective separation layer comprising the polyimide polymer with hydroxyl and acetoxy functional groups described in the present invention and a porous nonselective mechanical support layer made from a material different from the polyimide polymer with hydroxyl and acetoxy functional groups described in the present invention. The porous nonselective mechanical support layer made from a material different from the polyimide polymer with hydroxyl and acetoxy

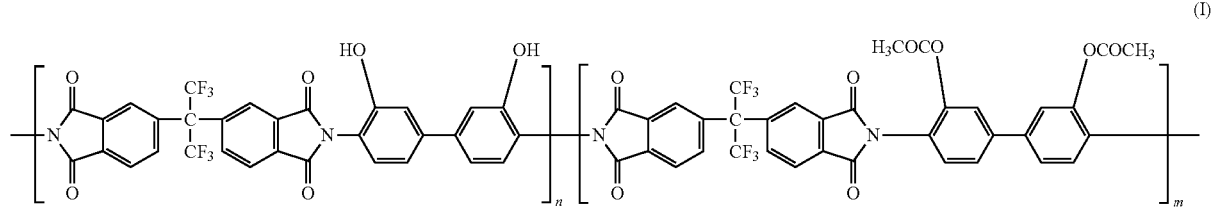

(I)

wherein n and m are independent integers from 20 to 500; wherein n:m is in a range of 1:1 to 8:1.

The polyimide polymer with hydroxyl and acetoxy functional groups used for making the high selectivity polyimide membrane described in the current invention have a weight average molecular weight in the range of 50,000 to 1,000,000 Daltons, preferably between 70,000 to 500,000 Daltons.

The high selectivity polyimide membrane comprising a polyimide polymer with hydroxyl and acetoxy functional groups in the present invention can be either asymmetric integrally skinned membrane or thin film composite (TFC) membrane.

The asymmetric integrally-skinned flat sheet or hollow fiber high selectivity polyimide membrane comprising a polyimide polymer with hydroxyl and acetoxy functional groups in the present invention was prepared by a phase inversion process, and then by applying a thin coating layer on the surface of the membrane.

The membrane dope formulation for the preparation of the asymmetric integrally-skinned flat sheet or hollow fiber polyimide membrane comprising a polyimide polymer with hydroxyl and acetoxy functional groups in the present invenfunctional groups described in the present invention with a low selectivity and high flux can be made from materials including cellulose acetate, cellulose triacetate, polysulfone, polyethersulfone, polyamide, polyimide, polyetherimide, polyurethane, polycarbonate, polystyrene, polybenzoxazole, or mixtures thereof.

One asymmetric integrally-skinned hollow fiber polyimide membrane comprising a polyimide polymer with hydroxyl and acetoxy functional groups described in the present invention is fabricated from a poly(2,2'-bis-(3,4-dicarboxyphenyl) hexafluoropropane dianhydride-3,3'-dihydroxy-4,4'-diamino-biphenyl-3,3'-diacetoxy-4,4'-diamino-biphenyl) (abbreviated as 6FDA-HAB-OH-OAc) synthesized from the condensation reaction of 2,2'-bis-(3,4-dicarboxyphenyl) hexafluoropropane dianhydride (6FDA) with 3,3'-dihydroxy-4,4'-diamino-biphenyl (HAB) in DMAc or NMP polar solvent by a two-step process involving the formation of the poly(amic acid) followed by a solution imidization process. Acetic anhydride was used as the dehydrating agent and pyridine was used as the imidization catalyst for the solution imidization reaction during the second step synthesis. More importantly, the amount of acetic anhydride used during the solution imidization reaction was controlled not only for the formation of acetoxy groups via the reaction between the hydroxyl groups and acetic anhydride, but also to achieve desired ratio of hydroxyl/acetoxy groups.

The 6FDA-HAB-OH-OAc asymmetric integrally-skinned hollow fiber polyimide membrane showed high $H_2/CH_4$ separation performance with both high $H_2$ permeance of 323 GPU and high $H_2/CH_4$ selectivity of 193 for $H_2/CH_4$ separation at 50° C. under 5617 kPa feed pressure with 10% $H_2$ and 90% $CH_4$ in the feed gas. The 6FDA-HAB-OH-OAc asymmetric integrally-skinned hollow fiber polyimide membrane also showed high $CO_2/CH_4$ separation performance with $CO_2$ permeance of 88 GPU and $CO_2/CH_4$ selectivity of 35.6 for $CO_2/CH_4$ separation at 50° C. under 5617 kPa feed pressure with 10% $CO_2$ and 90% $CH_4$ in the feed gas.

The invention provides a process for separating at least one gas from a mixture of gases using the high selectivity polyimide membrane comprising a polyimide polymer with hydroxyl and acetoxy functional groups described herein, the process comprising: (a) providing a high selectivity polyimide membrane comprising a polyimide polymer with hydroxyl and acetoxy functional groups described in the present invention which is permeable to said at least one gas; (b) contacting the mixture on one side of the high selectivity polyimide membrane comprising a polyimide polymer with hydroxyl and acetoxy functional groups to cause said at least one gas to permeate the membrane; and (c) removing from the opposite side of the membrane a permeate gas composition comprising a portion of said at least one gas which permeated said membrane.

branes that are used in these applications must have high selectivity, durability, and productivity in processing large volumes of gas or liquid in order to be economically successful. Membranes for gas separations have evolved rapidly in the past 25 years due to their easy processability for scale-up and low energy requirements. More than 90% of the membrane gas separation applications involve the separation of noncondensable gases: such as nitrogen from air, and hydrogen from nitrogen, argon or methane. Membrane gas separation is of special interest to petroleum producers and refiners, chemical companies, and industrial gas suppliers. Several applications of membrane gas separation have achieved commercial success, including nitrogen enrichment from air, hydrogen from nitrogen, argon or methane, carbon dioxide removal from natural gas and biogas and in enhanced oil recovery.

The present invention provides a high selectivity polyimide membrane comprising a polyimide polymer with hydroxyl and acetoxy functional groups. This invention also pertains to the application of the high selectivity polyimide membrane comprising a polyimide polymer with hydroxyl and acetoxy functional groups for $H_2$ purifications such as $H_2/CH_4$ separation, and also for a variety of other gas separations such as separations of $CO_2/CH_4$, $H_2S/CH_4$, $CO_2/N_2$, olefin/paraffin (e.g. propylene/propane), and $O_2/N_2$ separations.

The present invention provides a high selectivity polyimide membrane comprising a polyimide polymer with hydroxyl and acetoxy functional groups that comprises a plurality of repeating units of formula (I), wherein formula (I) is

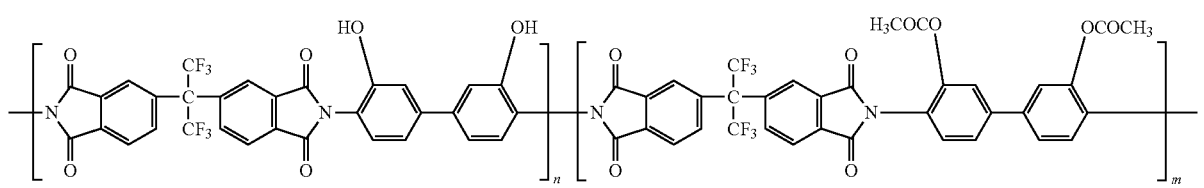

(I)

wherein n and m are independent integers from 20 to 500; wherein n:m is in a range of 1:1 to 8:1.

The polyimide polymer with hydroxyl and acetoxy functional groups used for making the high selectivity polyimide membrane described in the current invention have a weight average molecular weight in the range of 50,000 to 1,000,000 Daltons, preferably between 70,000 to 500,000 Daltons.

The high selectivity polyimide membrane comprising a polyimide polymer with hydroxyl and acetoxy functional groups in the present invention can be either asymmetric integrally skinned membrane or thin film composite (TFC) membrane.

The high selectivity polyimide membranes comprising a polyimide polymer with hydroxyl and acetoxy functional groups described in the current invention are not only suitable for $H_2$ purification application, but also suitable for a variety of other gas separations such as $CO_2/CH_4$, $O_2/N_2$, and $H_2S/CH_4$ separations.

DETAILED DESCRIPTION OF THE INVENTION

The use of membranes for separation of both gases and liquids is a growing technological area with potentially high economic reward due to the low energy requirements and the potential for scaling up of modular membrane designs. Advances in membrane technology, with the continuing development of new membrane materials and new methods for the production of high performance membranes will make this technology even more competitive with traditional, high-energy intensive and costly processes such as distillation. Among the applications for large scale gas separation membrane systems are nitrogen enrichment, oxygen enrichment, hydrogen recovery, removal of hydrogen sulfide and carbon dioxide from natural gas and dehydration of air and natural gas. Also, various hydrocarbon separations are potential applications for the appropriate membrane system. The mem- The asymmetric integrally-skinned flat sheet or hollow fiber high selectivity polyimide membrane comprising a polyimide polymer with hydroxyl and acetoxy functional groups in the present invention was prepared by a phase inversion process, and then by applying a thin coating layer on the surface of the membrane.

The membrane dope formulation for the preparation of asymmetric integrally-skinned flat sheet or hollow fiber polyimide membrane comprising a polyimide polymer with hydroxyl and acetoxy functional groups with high selectivities for gas separations in the present invention comprises good solvents for the polyimide polymer with hydroxyl and acetoxy functional groups that can completely dissolve the polymers. Representative good solvents for use in this invention include N-methylpyrrolidone (NMP), N,N-dimethyl acetamide (DMAC), methylene chloride, N,N-dimethylformamide (DMF), dimethyl sulfoxide (DMSO), dioxanes, 1,3-dioxolane, acetone, mixtures thereof, others known to those skilled in the art and mixtures thereof. In some cases, the membrane dope formulation for the preparation of asymmetric integrally-skinned flat sheet or hollow fiber polyimide membrane comprising a polyimide polymer with hydroxyl and acetoxy functional groups in the present invention also comprises poor solvents for the polyimide polymer with hydroxyl and acetoxy functional groups that cannot dissolve the polymers such as methanol, ethanol, tetrahydrofuran (THF), toluene, n-octane, n-decane, lactic acid, citric acid, isopropanol, and mixtures thereof. It is believed that the proper weight ratio of the solvents used in the present invention provides asymmetric integrally-skinned flat sheet or hollow fiber polyimide membrane comprising a polyimide polymer with hydroxyl and acetoxy functional groups with less than 200 nm super thin nonporous selective skin layer which results in high permeances.

One asymmetric integrally-skinned hollow fiber polyimide membrane comprising a polyimide polymer with hydroxyl and acetoxy functional groups described in the present invention is fabricated from a poly(2,2'-bis-(3,4-dicarboxyphenyl) hexafluoropropane dianhydride-3,3'-dihydroxy-4,4'-diamino-biphenyl-3,3'-diacetoxy-4,4'-diamino-biphenyl) (abbreviated as 6FDA-HAB-OH-OAc) synthesized from the condensation reaction of 6FDA with HAB in DMAc or NMP polar solvent by a two-step process involving the formation of the poly(amic acid) followed by a solution imidization process. Acetic anhydride was used as the dehydrating agent and pyridine was used as the imidization catalyst for the solution imidization reaction during the second step synthesis. More importantly, the amount of acetic anhydride used during the solution imidization reaction was controlled not only for the formation of acetoxy groups via the reaction between the hydroxyl groups and acetic anhydride, but also to achieve desired ratio of hydroxyl/acetoxy groups. The molar ratio of hydroxyl/acetoxy in 6FDA-HAB—OH-OAc is 3:1.

The 6FDA-HAB-OH-OAc asymmetric integrally-skinned hollow fiber polyimide membrane showed high $H_2/CH_4$ separation performance with both high $H_2$ permeance of 323 GPU and high $H_2/CH_4$ selectivity of 193 for $H_2/CH_4$ separation at 50° C. under 5617 kPa feed pressure with 10% $H_2$ and 90% $CH_4$ in the feed gas. The 6FDA-HAB-OH-OAc asymmetric integrally-skinned hollow fiber polyimide membrane also showed high $CO_2/CH_4$ separation performance with $CO_2$ permeance of 88 GPU and $CO_2/CH_4$ selectivity of 35.6 for $CO_2/CH_4$ separation at 50° C. under 5617 kPa feed pressure with 10% $CO_2$ and 90% $CH_4$ in the feed gas.

The thin film composite polyimide membrane comprising a polyimide polymer with hydroxyl and acetoxy functional groups described in the current invention comprises a thin nonporous selective separation layer comprising the polyimide polymer with hydroxyl and acetoxy functional groups described in the present invention and a porous nonselective mechanical support layer made from a material different from the polyimide polymer with hydroxyl and acetoxy functional groups described in the present invention. The thin film composite polyimide membrane comprising a polyimide polymer with hydroxyl and acetoxy functional groups described in the current invention has either hollow fiber or flat sheet geometry.

The porous nonselective mechanical support layer was made from a material different from the polyimide polymer with hydroxyl and acetoxy functional groups described in the present invention with a low selectivity and high flux. Selection of the porous nonselective mechanical support layer for the preparation of TFC polyimide membrane comprising a polyimide polymer with hydroxyl and acetoxy functional groups in the present invention may be made on the basis of the heat resistance, solvent resistance, and mechanical strength of the porous nonselective mechanical support layer, as well as other factors dictated by the operating conditions for selective permeation. The porous nonselective mechanical support layer is preferably at least partially self-supporting, and in some instances may be essentially self-supporting. The porous nonselective mechanical support layer may provide essentially all of the structural support for the membrane. Some preferred polymers different from the polyimide polymer with hydroxyl and acetoxy functional groups that are suitable for the preparation of the porous nonselective mechanical support layer for the TFC polyimide membrane comprising a polyimide polymer with hydroxyl and acetoxy functional groups according to the present invention include, but are not limited to, polysulfones, sulfonated polysulfones, polyethersulfones (PESs), sulfonated PESs, polyethers, polyetherimides such as Ultem, cellulosic polymers such as cellulose acetate and cellulose triacetate, polyamides, polyimides such as P84 and P84HT, polyether ketones, and blends thereof.

Some preferred solvents that can be used for dissolving the polyimide polymer with hydroxyl and acetoxy functional groups for the preparation of TFC polyimide membrane comprising a polyimide polymer with hydroxyl and acetoxy functional groups described in the current invention include NMP, DMAC, methylene chloride, DMF, DMSO, dioxanes, 1,3-dioxolane, acetone, isopropanol, and mixtures thereof. For the preparation of TFC flat sheet polyimide membrane comprising a polyimide polymer with hydroxyl and acetoxy functional groups, it is preferred that the solution of the polyimide polymer with hydroxyl and acetoxy functional groups has a concentration of from about 1 to about 20 wt % to provide an effective coating. The dilute solution of the polyimide polymer with hydroxyl and acetoxy functional groups is applied to the surface of the flat sheet porous nonselective mechanical support layer by dip-coating, spin coating, casting, spraying, painting, and other known conventional solution coating technologies. For the preparation of TFC hollow fiber polyimide membrane comprising a polyimide polymer with hydroxyl and acetoxy functional groups, it is preferred that the solution of the polyimide polymer with hydroxyl and acetoxy functional groups has a concentration of from about 20 to about 40 wt %. The solution of the polyimide polymer with hydroxyl and acetoxy functional groups and the polymer solution for the formation of the porous nonselective mechanical support layer were co-extruded from a spinneret to form TFC hollow fiber polyimide membrane comprising a polyimide polymer with hydroxyl and acetoxy functional groups.

The invention provides a process for separating at least one gas from a mixture of gases using high selectivity polyimide membrane comprising a polyimide polymer with hydroxyl and acetoxy functional groups described in the present invention, the process comprising: (a) providing a high selectivity polyimide membrane comprising a polyimide polymer with hydroxyl and acetoxy functional groups described in the present invention which is permeable to said at least one gas; (b) contacting the mixture on one side of the high selectivity polyimide membrane comprising a polyimide polymer with hydroxyl and acetoxy functional groups described in the present invention to cause said at least one gas to permeate the membrane; and (c) removing from the opposite side of the membrane a permeate gas composition comprising a portion of said at least one gas which permeated said membrane.

The high selectivity polyimide membrane comprising a polyimide polymer with hydroxyl and acetoxy functional groups described in the present invention is especially useful in the purification, separation or adsorption of a particular species in the liquid or gas phase.

The high selectivity polyimide membrane comprising a polyimide polymer with hydroxyl and acetoxy functional groups described in the present invention is especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the high selectivity polyimide membrane comprising a polyimide polymer with hydroxyl and acetoxy functional groups described in the present invention. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. A differential pressure of at least 0.7 MPa (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the high selectivity polyimide membrane comprising a polyimide polymer with hydroxyl and acetoxy functional groups of the present invention will range from about −20° to about 100° C., and most preferably, the effective operating temperature of the membranes of the present invention will range from about 25° to about 100° C.

The high selectivity polyimide membrane comprising a polyimide polymer with hydroxyl and acetoxy functional groups described in the present invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which the high selectivity polyimide membrane comprising a polyimide polymer with hydroxyl and acetoxy functional groups described in the present invention may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery.

The high selectivity polyimide membrane comprising a polyimide polymer with hydroxyl and acetoxy functional groups described in the present invention also has immediate application to concentrate olefin in a paraffin/olefin stream for olefin cracking application. For example, the high selectivity polyimide membrane comprising a polyimide polymer with hydroxyl and acetoxy functional groups described in the present invention can be used for propylene/propane separation to increase the concentration of the effluent in a catalytic dehydrogenation reaction for the production of propylene from propane and isobutylene from isobutane. Therefore, the number of stages of a propylene/propane splitter that is required to get polymer grade propylene can be reduced. Another application for the high selectivity polyimide membrane comprising a polyimide polymer with hydroxyl and acetoxy functional groups described in the present invention is for separating isoparaffin and normal paraffin in light paraffin isomerization and MaxEne™, a process for enhancing the concentration of normal paraffin (n-paraffin) in the naphtha cracker feedstock, which can be then converted to ethylene.

The high selectivity polyimide membrane comprising a polyimide polymer with hydroxyl and acetoxy functional groups described in the present invention can also be operated at high temperature to provide the sufficient dew point margin for natural gas upgrading (e.g, $CO_2$ removal from natural gas). The high selectivity polyimide membrane comprising a polyimide polymer with hydroxyl and acetoxy functional groups described in the present invention can be used in either a single stage membrane or as the first or/and second stage membrane in a two stage membrane system for natural gas upgrading.

EXAMPLES

The following examples are provided to illustrate one or more preferred embodiments of the invention, but are not limited embodiments thereof. Numerous variations can be made to the following examples that lie within the scope of the invention.

Example 1

Preparation of 6FDA-HAB-OH-OAc Polyimide Dense Film Membrane

An aromatic polyimide poly(2,2'-bis-(3,4-dicarboxyphenyl)hexafluoropropane dianhydride-3,3'-dihydroxy-4,4'-diamino-biphenyl-3,3'-diacetoxy-4,4'-diamino-biphenyl) (abbreviated as 6FDA-HAB-OH-OAc) was synthesized from the condensation reaction of 2,2'-bis-(3,4-dicarboxyphenyl)

hexafluoropropane dianhydride (6FDA) with 3,3'-dihydroxy-4,4'-diamino-biphenyl (HAB) in DMAc or NMP polar solvent by a two-step process involving the formation of the poly(amic acid) followed by a solution imidization process. Acetic anhydride was used as the dehydrating agent and for the reaction with hydroxyl groups on the polyimide polymer chain to achieve a molar ratio of 3:1 for hydroxyl/acetoxy in 6FDA-HAB-OH-OAc polyimide. 4.0 G of 6FDA-HAB-OH-OAc was dissolved in 26.0 g of NMP solvent. The mixture was mechanically stirred for 2 hours to form a homogeneous 6FDA-HAB-OH-OAc casting dope. The resulting homogeneous casting dope was filtered and allowed to degas overnight. The 6FDA-HAB-OH-OAc polyimide dense film membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for 48 hours to completely remove the residual solvents to form a polymer membrane in dense film.

Comparative Example to Example 1

Preparation of 6FDA-HAB-OAc Polyimide Dense Film Membrane

An aromatic polyimide poly(2,2'-bis-(3,4-dicarboxyphenyl)hexafluoropropane dianhydride-3,3'-diacetoxy-4,4'-diamino-biphenyl) (abbreviated as 6FDA-HAB-OAc) was synthesized from the condensation reaction of 6FDA with HAB in DMAc or NMP polar solvent by a two-step process involving the formation of the poly(amic acid) followed by a solution imidization process. Acetic anhydride was used as the dehydrating agent and for the reaction with hydroxyl groups on the polyimide polymer chain to achieve 100% conversion of hydroxyl groups to acetoxy groups with a molar ratio of 0:1 for hydroxyl/acetoxy in 6FDA-HAB-OAc. 6FDA-HAB-OAc dense film membrane was prepared using a procedure similar to that for 6FDA-HAB-OAc dense film membrane as described in Example 1.

Example 2

Evaluation of $CO_2/CH_4$ and $H_2/CH_4$ Separation Performance of 6FDA-HAB-OH-OAc and 6FDA-HAB-OAc Polyimide Dense Film Membranes The 6FDA-HAB-OH-OAc and 6FDA-HAB-OAc polyimide dense film membranes were tested for $CO_2/CH_4$ and $H_2/CH_4$ separations at 50° C. under 791 kPa (100 psig) pure gas feed pressure. The results in Tables 1 and 2 show that the 6FDA-HAB-OH-OAc polyimide dense film membrane comprising 6FDA-HAB-OH-OAc polyimide polymer with 3:1 molar ratio of hydroxyl/acetoxy has intrinsic $CO_2$ permeability of 6.44 Barrers (1 Barrer=$10^{-10}$ cm$^3$ (STP) cm/cm$^2$ s (cm Hg)) and high single-gas $CO_2/CH_4$ selectivity of 46.7 at 50° C. under 791 kPa for $CO_2/CH_4$ separation. This membrane also has intrinsic $H_2$ permeability of 24.8 Barrers and high single-gas $H_2/CH_4$ selectivity of 218.8 at 50° C. under 791 kPa for $H_2/CH_4$ separation. However, the 6FDA-HAB-OAc dense film membrane comprising 6FDA-HAB-OAc polyimide polymer with 0:1 molar ratio of hydroxyl/acetoxy showed higher permeabilities and much lower selectivities for $CO_2/CH_4$ and $H_2/CH_4$ separations. The significantly higher selectivities and reasonable permeabilities for 6FDA-HAB-OH-OAc dense film membrane is due to the control of hydroxyl/acetoxy ratio in the polymer chain.

TABLE 1

Pure gas permeation test results of 6FDA-HAB-OH-OAc and 6FDA-HAB-OAc polyimide dense film membranes for $CO_2/CH_4$ separation *

| Dense Film Membrane | $P_{CO2}$ (Barrer) | $\alpha_{CO2/CH4}$ |
|---|---|---|
| 6FDA-HAB-OH-OAc | 6.44 | 46.7 |
| 6FDA-HAB-OAc | 7.88 | 32.7 |

* $P_{CO2}$ and $P_{CH4}$ were tested at 50° C. and 791 kPa (100 psig);
1 Barrer = $10^{-10}$ cm$^3$(STP).cm/cm$^2$.sec.cmHg.

TABLE 2

Pure gas permeation test results of 6FDA-HAB-OH-OAc and 6FDA-HAB-OAc polyimide dense film membranes for H2/CH4 separation *

| Dense Film Membrane | $P_{H2}$ (Barrer) | $\alpha_{H2/CH4}$ |
|---|---|---|
| 6FDA-HAB-OH-OAc | 24.8 | 218.8 |
| 6FDA-HAB-OAc | 28.3 | 117.5 |

* $P_{CO2}$ and $P_{CH4}$ were tested at 50° C. and 791 kPa (100 psig);
1 Barrer = $10^{-10}$ cm$^3$(STP).cm/cm$^2$.sec.cmHg.

Example 3

Preparation of 6FDA-HAB-OH-OAc Polyimide Hollow Fiber Membranes

A hollow fiber spinning dope containing 13.2 g of 6FDA-HAB-OH-OAc polyimide, 65.0 g of NMP, 7.4 g of 1,3-dioxolane, and 2.6 g of acetone was prepared. The spinning dope was extruded at a flow rate of 3.0 mL/min through a spinneret at 50° C. spinning temperature. A bore fluid containing 10% by weight of water in NMP was injected to the bore of the fiber at a flow rate of 0.6 mL/min simultaneously with the extruding of the spinning dope. The nascent fiber traveled through an air gap length of 5-7 cm at room temperature, and then was immersed into a water coagulant bath at 17.9° C. and wound up at a rate of 23-30 m/min. The water-wet fiber was annealed in a hot water bath at 85° C. for 30 minutes. The annealed water-wet fiber was then sequentially exchanged with methanol and hexane for three times and for 30 minutes each time, followed by drying at 100° C. in an oven for 1 hour to form 6FDA-HAB-OH-OAc polyimide hollow fiber membranes with the spinning conditions listed in Table 3.

TABLE 3

Spinning conditions for 6FDA-HAB-OH-OAc polyimide hollow fiber membranes

| Hollow Fiber Membrane | Air gap (cm) | Dope rate (mL/min) | Bore rate (mL/min) | Take-up rate (m/min) |
|---|---|---|---|---|
| 6FDA-HAB-OH-OAc (G) | 3 | 3.0 | 0.6 | 23 |
| 6FDA-HAB-OH-OAc (O) | 3 | 3.0 | 0.6 | 30 |
| 6FDA-HAB-OH-OAc (P) | 5 | 3.0 | 0.6 | 30 |
| 6FDA-HAB-OH-OAc (W) | 5 | 3.0 | 0.6 | 23 |
| 6FDA-HAB-OH-OAc (Y) | 7 | 3.0 | 0.6 | 23 |
| 6FDA-HAB-OH-OAc (GY) | 7 | 3.0 | 0.6 | 30 |

Comparative Example to Example 3

Preparation of 6FDA-HAB-OAc Polyimide Hollow Fiber Membranes

A hollow fiber spinning dope containing 28.0 g of 6FDA-HAB-OAc polyimide, 65.0 g of NMP, 8.8 g of 1,3-dioxolane, and 2.6 g of acetone was prepared. The spinning dope was extruded at a flow rate of 1.1-2.6 mL/min through a spinneret at 50° C. spinning temperature. A bore fluid containing 10% by weight of water in NMP was injected to the bore of the fiber at a flow rate of 0.4-0.8 mL/min simultaneously with the extruding of the spinning dope. The nascent fiber traveled through an air gap length of 10-15 cm at room temperature, and then was immersed into a water coagulant bath at 17.9° C. and wound up at a rate of 10-23 m/min. The water-wet fiber was annealed in a hot water bath at 85° C. for 30 minutes. The annealed water-wet fiber was then sequentially exchanged with methanol and hexane for three times and for 30 minutes each time, followed by drying at 100° C. in an oven for 1 hour to form 6FDA-HAB-OAc polyimide hollow fiber membranes with the spinning conditions listed in Table 3.

TABLE 4

Spinning conditions for 6FDA-HAB-OAc polyimide hollow fiber membranes

| Hollow Fiber Membrane | Air gap (cm) | Dope rate (mL/min) | Bore rate (mL/min) | Take-up rate (m/min) |
|---|---|---|---|---|
| 6FDA-HAB-OAc (G) | 10 | 1.1 | 0.4 | 10 |
| 6FDA-HAB-OAc (Y) | 15 | 2.6 | 0.8 | 23 |
| 6FDA-HAB-OAc (P) | 10 | 2.6 | 0.8 | 23 |

Example 4

Evaluation of $CO_2/CH_4$ Separation Performance of 6FDA-HAB-OH-OAc and 6FDA-HAB-OAc Polyimide Hollow Fiber Membranes The asymmetric integrally-skinned 6FDA-HAB-OH-OAc and 6FDA-HAB-OAc polyimide hollow fiber membranes were tested for $CO_2/CH_4$ separation at 50° C. under 5617 kPa (800 psig) feed gas pressure with 10% of $CO_2$ and 90% of $CH_4$ in the feed. The results are shown in Table 5. It can be seen from Table 5 that the 6FDA-HAB-OH-OAc polyimide hollow fiber membranes comprising 6FDA-HAB-OH-OAc polyimide with a molar ratio of 3:1 for hydroxyl/acetoxy described in the current invention showed high $CO_2$ permeances of 88-94 GPU and high $CO_2/CH_4$ selectivities over 30 under 5617 kPa high pressure at 50° C. The 6FDA-HAB-OAc polyimide hollow fiber membranes comprising 6FDA-HAB-OAc polyimide without any hydroxyl groups showed higher $CO_2$ permeances of 130 to 137 GPU, but much lower $CO_2/CH_4$ selectivities of less than 22 compared with 6FDA-HAB-OH-OAc polyimide hollow fiber membranes. These results demonstrated that the use of 6FDA-HAB-OH-OAc polyimide with controlled hydroxyl and acetoxy groups in the polymer chain is critical to prepare high selectivity polyimide hollow fiber membranes.

TABLE 5

$CO_2/CH_4$ separation performance of 6FDA-HAB-OH-OAc and 6FDA-HAB-OAc polyimide hollow fiber membranes

| Membrane | $CO_2$ permeance (GPU) | $CO_2/CH_4$ selectivity |
|---|---|---|
| 6FDA-HAB-OH-OAc (Y) | 88.2 | 35.6 |
| 6FDA-HAB-OH-OAc (G) | 94.0 | 30.8 |
| 6FDA-HAB-OAc (G) | 137.3 | 21.6 |
| 6FDA-HAB-OAc (P) | 129.8 | 19.0 |

1 GPU = $10^{-6}$ cm$^3$ (STP)/cm$^2$ s (cm Hg) Testing conditions: 50° C., 5617 kPa (800 psig) feed gas pressure, 10% $CO_2$ and 90% of $CH_4$ in the feed.

Example 5

Evaluation of $H_2/CH_4$ Separation Performance of 6FDA-HAB-OH-OAc Polyimide Hollow Fiber Membranes The asymmetric integrally-skinned 6FDA-HAB-OH-OAc polyimide hollow fiber membranes were tested for $H_2/CH_4$ separation at 50° C. under 4238 kPa (600 psig) feed gas pressure with 10% of $H_2$ and 90% of $CH_4$ in the feed. The results are shown in Table 6. It can be seen from Table 6 that the 6FDA-HAB-OH-OAc polyimide hollow fiber membranes comprising 6FDA-HAB-OH-OAc polyimide with a molar ratio of 3:1 for hydroxyl/acetoxy described in the current invention showed high $H_2$ permeances of over 300 GPU and high $H_2/CH_4$ selectivities of about 185 under 4238 kPa high pressure at 50° C.

TABLE 6

$H_2/CH_4$ separation performance of 6FDA-HAB-OH-OAc polyimide hollow fiber membranes

| Membrane | $H_2$ permeance (GPU) | $H_2/CH_4$ selectivity |
|---|---|---|
| 6FDA-HAB-OH-OAc (Y) | 356.9 | 185.2 |
| 6FDA-HAB-OH-OAc (GY) | 333.9 | 185.3 |

1 GPU = $10^{-6}$ cm$^3$ (STP)/cm$^2$ s (cm Hg) Testing conditions: 50° C., 4238 kPa (600 psig) feed gas pressure, 10% $H_2$ and 90% of $CH_4$ in the feed.

The invention claimed is:

1. A polyimide membrane comprising a polyimide polymer with hydroxyl and acetoxy functional groups wherein the molar ratio of said hydroxyl functional groups to said acetoxy functional groups is in a range of 1:1 to 8:1 wherein said polyimide polymer comprises a plurality of repeating units of formula (I), wherein formula (I) is

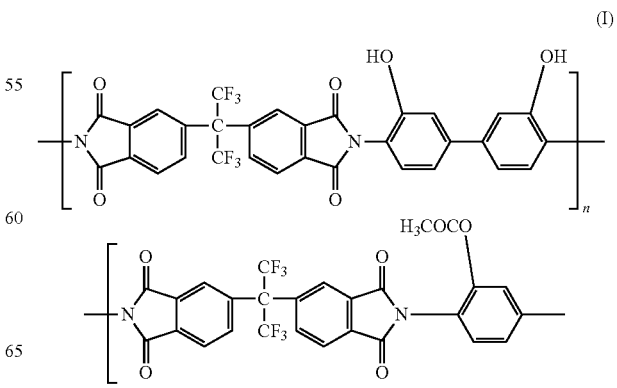

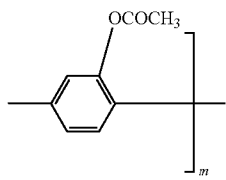

wherein n and m are independent integers from 20 to 500; wherein n:m is in a range of 1:1 to 8:1.

2. The polyimide membrane of claim 1 formed into an asymmetric integrally skinned flat sheet membrane, an asymmetric integrally skinned hollow fiber membrane, a thin film composite flat sheet membrane or a thin film composite hollow fiber membrane.

3. The polyimide membrane of claim 1 wherein said polyimide polymer has a weight average molecular weight in a range of 50,000 to 1,000,000 Daltons.

4. The polyimide membrane of claim 2 wherein said thin film composite membrane comprises a thin nonporous selective separation layer comprising said polyimide and a porous nonselective mechanical support layer made from a material different from said polyimide polymer.

5. The polyimide membrane of claim 4 wherein said porous nonselective mechanical support layer comprises a material selected from the group consisting of cellulose acetate, cellulose triacetate, polysulfone, polyethersulfone, polyamide, polyimide, polyetherimide, polyurethane, polycarbonate, polystyrene, polybenzoxazole, and mixtures thereof.

6. The polyimide membrane of claim 1 wherein said polyimide polymer comprises a poly(2,2'-bis-(3,4-dicarboxyphenyl)hexafluoropropane dianhydride-3,3'-dihydroxy-4,4'-diamino-biphenyl-3,3'-diacetoxy-4,4'-diamino-biphenyl).

7. The polyimide membrane of claim 1 wherein said polyimide polymer has a molar ratio of hydroxyl to acetoxy groups of about 3:1.

8. A process of making a polyimide membrane comprising a polyimide polymer with hydroxyl and acetoxy functional groups wherein the molar ratio of said hydroxyl functional groups to said acetoxy functional groups is in a range of 1:1 to 8:1, said process comprising preparing a solution of said polyimide polymer and then applying said solution of said polyimide polymer to a surface of a porous nonselective mechanical support layer wherein said polyimide polymer comprises a plurality of repeating units of formula (I), wherein formula (I) is

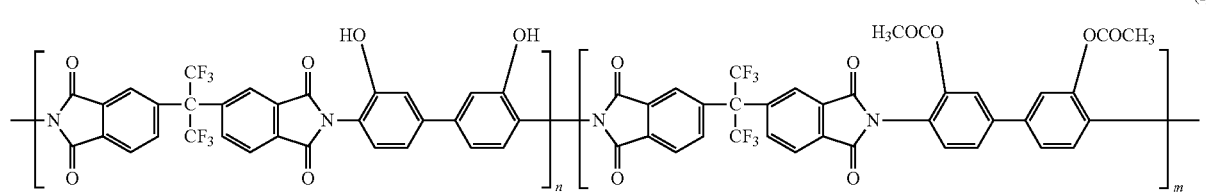

wherein n and m are independent integers from 20 to 500; wherein n:m is in a range of 1:1 to 8:1.

9. The process of claim 8 wherein said polyimide polymer is soluble in a solvent selected from the group consisting of N-methylpyrrolidone, N,N-dimethyl acetamide, methylene chloride, N,N-dimethylformamide, dimethyl sulfoxide, dioxanes, 1,3-dioxolane, acetone, and mixtures thereof.

10. The process of claim 8 wherein said polyimide polymer is poorly soluble in a solvent selected from the group consisting of methanol, ethanol, tetrahydrofuran (THF), toluene, n-octane, n-decane, lactic acid, citric acid, isopropanol, and mixtures thereof.

11. The process of claim 8 wherein said polyimide polymer is prepared by a two-step process wherein a poly(amic acid) is first formed followed by a solution chemical imidization step.

* * * * *